UNITED STATES PATENT OFFICE.

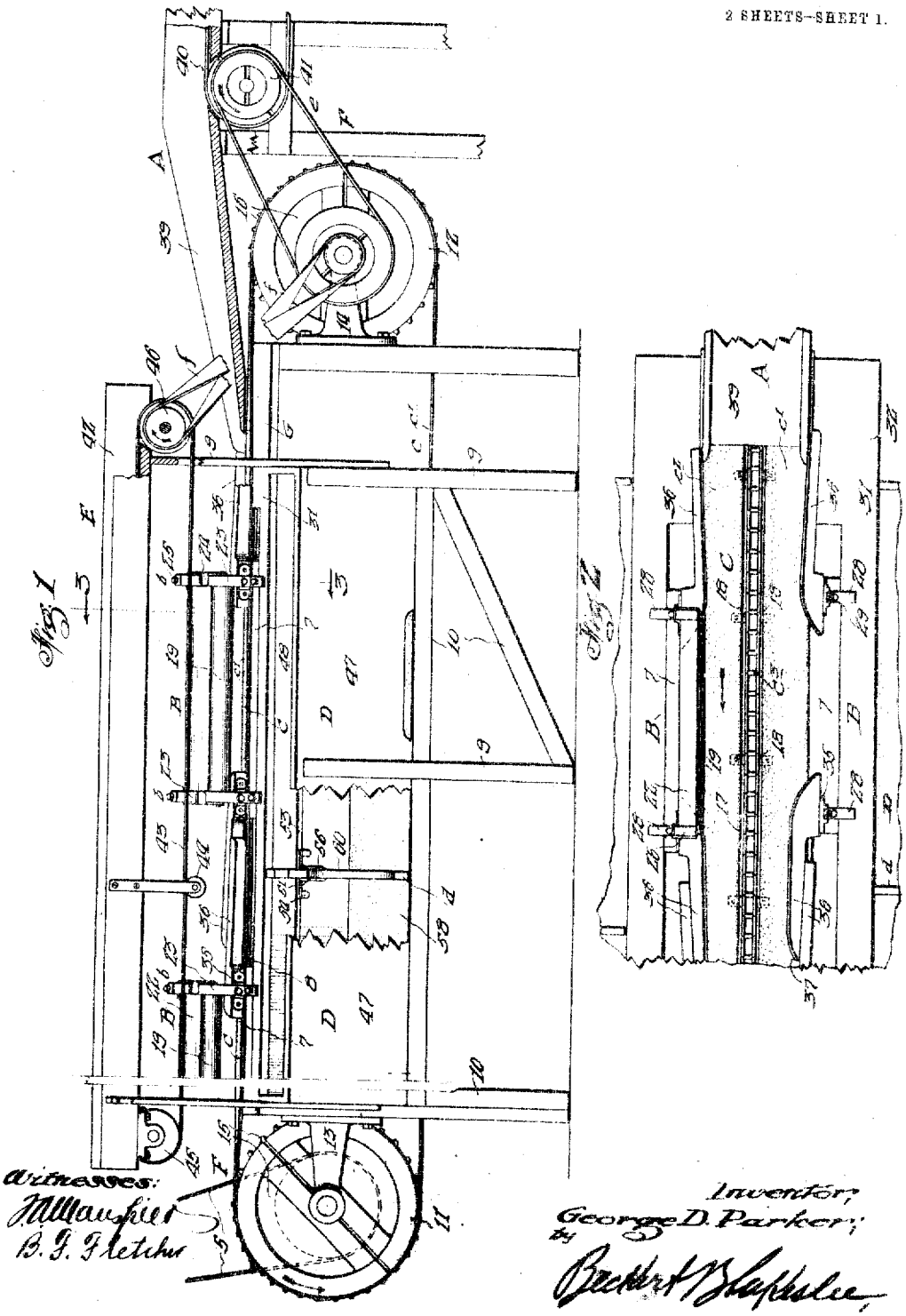

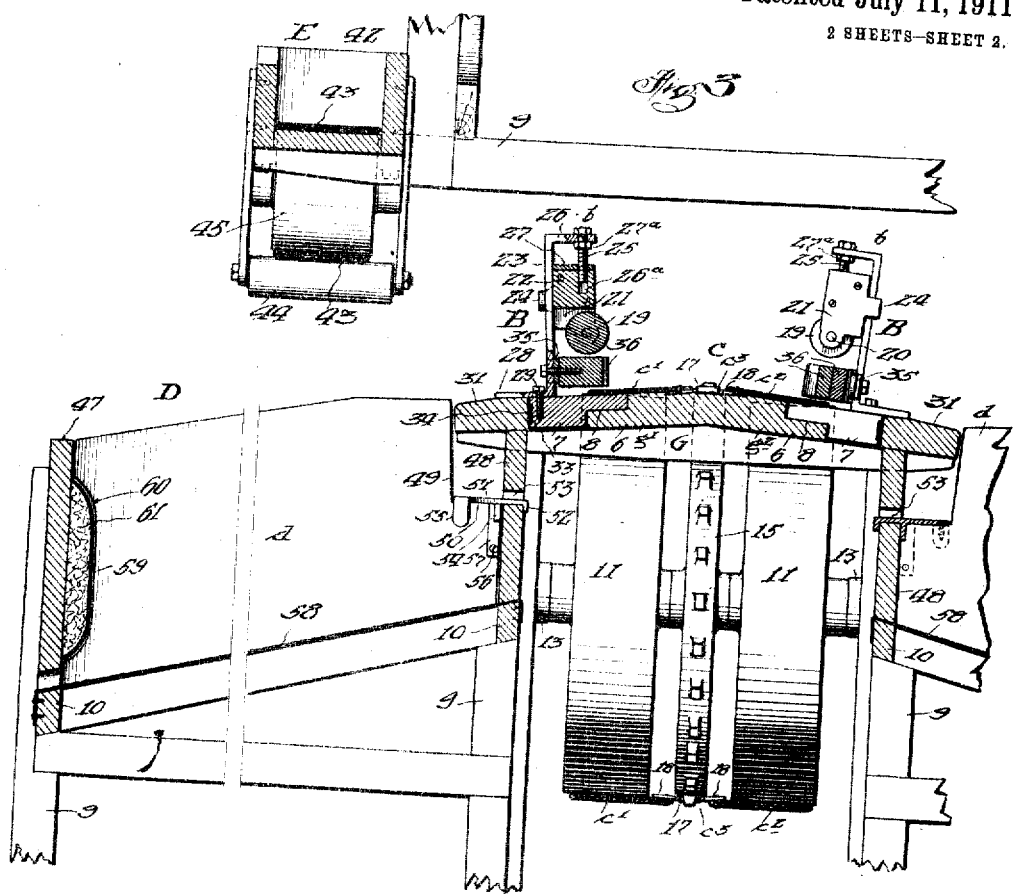

GEORGE D. PARKER, OF RIVERSIDE, CALIFORNIA.

FRUIT SIZER OR GRADER.

997,468.  Specification of Letters Patent.  Patented July 11, 1911.

Application filed March 31, 1910. Serial No. 553,438.

*To all whom it may concern:*

Be it known that I, GEORGE D. PARKER, a citizen of the United States, residing at Riverside, in the county of Riverside and State of California, have invented new and useful Improvements in Fruit Sizers or Graders, of which the following is a specification.

This invention relates to fruit sizers or graders; and it has for its object to provide improvements in sizers or graders for separating fruit into classes of various sizes and grades, which will be relatively simple and inexpensive in construction, and generally superior in point of positiveness and accuracy of operation, and facility of adjustment of parts and control in operation, and which will also be generally superior in efficiency and serviceability.

With the above general objects in view, the invention consists in the novel provision, construction, formation, combination, association and relative arrangement of parts, members and features, all as hereinafter described, shown in the drawings, and finally pointed out in claims.

In the drawings:—Figure 1 is a longitudinal side elevation, partly in section and partly broken away for clearness of illustration, of a fruit sizer or grader embodying the invention; Fig. 2 is a partial or fragmentary top plan view thereof; Fig. 3 is an enlarged detail transverse sectional view thereof, partly in full lines and partly broken away for clearness of illustration, the same being taken upon the section line 3—3, Fig. 1, looking in the direction of the appended arrows; and, Fig. 4 is a detail isometric view, upon substantially the same scale as that of Fig. 3, and illustrating in a fragmentary manner an essential feature of the invention consisting of an adjustable grading or sizing element.

Corresponding parts in all the figures are denoted by the same reference characters.

Referring with particularity to the drawings, the improved fruit sizer or grader comprises supply means A, sizing or grading members B, and feed means C by which the fruit is conveyed from the supply means to the sizing or grading members whence the fruit passes, in accordance with the sizes thereof, to points of deposit or receptacles such as bins D which, in accordance with the invention, are provided with adjustable sidewalls $d$ whereby the said bins may be enlarged or contracted laterally, or longitudinally of the feed means C; and the sizing or grading members B are adjustably mounted to provide for variations of the sizes or grades of fruit of which they respectively permit passage to the bins D. I further provide imperfect fruit conveying means E to which is committed such of the fruit as is found to be unfit for use with the fruit passed to the bins D; and the feed means C, supply means A and conveying means E are jointly actuated by operating means F, the feed means C being primarily actuated from a suitable prime mover or source of power, as by a belt 5. Operative connections $e$ and $f$ extend respectively from the feed means C to the conveying means E and the supply means A.

The feed means C preferably comprises two jointly operated members $c^1$ and $c^2$ which are both connected with a drive member $c^3$ which co-acts with the operating mean F; and said members $c^1$ and $c^2$ may each comprise an endless belt, said belts traversing adjacent paths and in their upper courses overlying a table or support G having two lateral portions $g^1$ and $g^2$ slightly downwardly inclined in opposite directions, from a horizontal plane; and the sizing or grading members B are arranged in series adjacent to each of the belts $c^1$ and $c^2$, being supported upon adjuncts of the table or support G, which latter preferably consist of longitudinal portions 6, and base plates 7 for the sizing or grading members B, the same being lap-jointed, as at 8. The table or support G is mounted upon suitable uprights 9 which are longitudinally and diagonally braced, as at 10, the supports and braces 9 and 10 being extended laterally to accommodate the bins D which are arranged at each side of the table or support G in a series longitudinally of the apparatus or mechanism.

A preferred form and construction of parts, members and features entering into the embodiment of the invention and the essential features thereof, together with a preferred combination and association thereof, is as follows:—

The endless belts $c^1$ and $c^2$ are trained over two pairs of pulleys, 11 and 12, which are suitably journaled, as at 13 and 14 respectively, at the opposite ends of the main frame which includes the uprights 9 and braces 10; and the pulleys of each pair are spaced apart sufficiently to accommodate a sprocket wheel 15 and 16 respectively, over and around each of which sprocket wheels is trained an endless link belt 17 which is tied to the flat belts $c^1$ and $c^2$ at predetermined intervals, as at 18, insuring joint and equal movement of said flat belts and the intermediate link belt. In the upper courses taken by the flat belts they are brought into parallel relation with and above the said portions $g^1$ and $g^2$ of the table G so as to conform to the slight angular relation above described and clearly shown in Fig. 3, wherefrom it results that the fruit conveyed by either flat belt is directed laterally upon the same, by gravity, toward the sizing or grading members B of the series provided for the sorting of the fruit so fed.

Each of the sizing or grading members B comprises a grading roller 19 which is so disposed that its axis of rotation is substantially parallel with the course of travel of the flat belts by means of which the fruit is fed, and each grading roller is disposed partially above one of the flat belts, whereby fruit is directly fed to the respective sizing and grading member by the respective flat belt; and each of the rollers 19 is provided with end bearings 20 journaled in side plates or cheeks 21 of a carriage 22 adjustably mounted upon uprights 23 and maintained in connection therewith by fingers 24 which play vertically or substantially vertically upon the uprights 23; adjusting means $b$ being provided for the regulation of the elevation of each grading roller 19 with respect to the plane of movement of the respective flat feed belt; said adjusting means consisting, as shown, of adjusting screws 25 passed through openings in the angularly directed upper portions 26 of the uprights 23 and entering internally threaded chambers $26^a$ in the carriages 22, or internally threaded openings in cap plates 27 upon said carriage; said adjusting screws 25 being provided with lock nuts $27^a$ bearing beneath the said upper portions 26 of the uprights 23. The lower end portions of the uprights 23 are angularly bent in directions opposite of that of the upper portions 26 and are bolted, as at 29, to the respective base plate 7, one base plate being provided for each pair of uprights 23; and each base plate 7 is adapted to be disposed between the respective table or support side section 6 and a side rail 31, one of which rails extends at each side of the table or support C, being connected therewith at its ends, as at 32, and spaced therefrom intermediately, the base plates overlapping the adjacent table or support section 6, as at 8, as above described. Each of the base plates 7 is chambered at its outer edge portion, as at 34, to receive a curved leaf spring 33 which bears tensionally against the adjacent rail 31, whereby each base plate and the sizing or grading member B organized as described and mounted thereupon may be adjusted longitudinally of the table or support C at one side thereof, and tensionally held in position of adjustment; and the angular end portions 28 of the uprights 23 bearing upon the rail 31 maintain the base plate in its vertical location, in combination with the over-lapping joint at 8.

Suitably socketed and bolted to the lower portion of each upright 23, as at 35, is a guide-arm 36 which projects laterally from the respective base plate 7 toward the next adjacent base plate, from which latter base plate a similar guide-arm 36 projects, both guide arms being joined in overlapping relation, as clearly shown in Fig. 2; and said guide arms slightly overhang the respective flat belt $c^1$ or $c^2$, at the outer edge portions of the same, where said guide-arms overlap, being rounded, as at 37, so as not to impede the motion of the fruit as the same is advanced by the belt. The fruit passes beneath each grading roller 19 and between the inner ends of the guide-arms 36 which are connected with the uprights 23 supporting such grading roller; and similar guide-arms 36 project from the uprights 23 next adjacent to the supply means A and embrace between the same the side walls of a chute 39 embraced within the supply means A, which further comprise an endless belt 40 entering the chute 39 and trained about a pulley 41 journaled beneath the chute 39 and actuated by the operative connections or belt $e$. The guide arms 36 extend, in the main, parallel with the course of travel of the fruit as moved by the feed means C.

The conveying means E for imperfect fruit comprise a trough or chute 42 mounted upon frame members 9 above and at one side of the feed means C, and an endless belt 43 which in its upper course moves through said trough or chute and in its lower course beneath the same, passing over an idler pulley 44 beneath the trough; said belt being trained about pulleys 45 and 46 journaled beneath the trough, and the latter of which is actuated by the operative connections or belt $f$.

The bins D at each side of the machine and the feed means C thereof, comprise a continuous outer wall 47, a continuous inner wall 48, and a plurality of laterally adjustable bin walls $d$ as above recited. Each side wall $d$ is cut away, as at 49, to accommodate the adjacent rail 31 and to form a shoulder 50 which is provided with a hanger or sliding bracket 51 having two divergent or spaced arms 52 projecting through an elongated slot 53 in the respective fixed longitudinal wall 48 and engaging with the inner face thereof; each of the arms 52 being provided with a depending finger 54 engaging the inner face of the wall 48 and a depending finger 55 engaging one side of the wall $d$; and spaced fingers 56 depend from the respective arms 51 so as to embrace the wall $d$ at its vertical edge portion, and are secured thereto, as at 57. Each wall $d$ may thus be adjusted longitudinally of the continuous longitudinal bin walls 47 and 48, the lower edge of the same resting upon the laterally slanting bin bottom 58, common to the entire bin construction; and the outer vertical edge portion 59 of each bin wall $d$ being cut out, as at 60, to accommodate a buffer or padding 61 upon the respective continuous bin wall 47.

The operation, method of use and advantages of the improvements in fruit sizers or graders constituting the invention will be readily understood from the foregoing description, taken in connection with the accompanying drawings and the following statement:—The fruit, such as oranges, is conducted to the machine or apparatus by the supply means A, being led along a chute 39 in a continuous stream to the feed means C, the chute 39 overlying the flat belts $c^1$ and $c^2$ at the initial end portions of the upper courses thereof. The fruit stream divides into two parts at the respective sides of the drive member $c^3$ of the feed means, and the opposite inclinations laterally of the table or support portions 6 and of the belts $c^1$ and $c^2$ lying thereon causes the fruit to roll toward the guide-arms 36 embraced within the sizing or grading members B. As each fruit unit in its movement upon its flat belt is brought to registration with one of the grading rollers 19 and the space between the same and the respective base plate 7, it passes beneath such roller and over the respective base plate and into one of the bins D, providing its diameter is sufficiently small to permit of its passage beneath the roller, the base plates 7 and the side rails 31 being inclined laterally in common with the table or base portions or sections 6. The carriages 22 and their grading rollers 19 are adjusted to different heights above their base plates 7 by the adjusting means $b$ of each, and such adjustment is progressive from the supply means A toward the other end of the machine or apparatus, each grading roller on each side of the machine being adjusted to a slightly greater altitude above its base plate than the next adjacent grading roller in the direction of the supply means; whereby the smallest fruit enters the bins next adjacent to the supply means, and the successive bins along the sides of the base or table G receive successively larger and larger sizes of fruit. The number of sizes of fruit produced in the sizing or grading operation is manifestly equal to the numbers of grading members provided at both sides of the apparatus; and one or more of such grading members B may be removed from the apparatus or machine or mechanism, the spaces between the same being taken up by the overlapping guide-arms 36 which confine the fruit to the proper courses of travel. Furthermore, each grading member may be set for the selection of the particular size or grade number of fruit, by utilizing the adjusting means $b$, and the size of each bin may be varied by the adjustment of its side bin walls $d$ relatively, additional side walls $d$ being provided when a large number of small bins are to be utilized in connection with an increased number of grading operations. The fruit as it falls into the bins D rolls or bounds along the bin bottom 58 and strikes against the yielding buffer 61 which prevents injury of the fruit.

The drive member $c^3$ of the feed means C positively actuates both flat feed belts $c^1$ and $c^2$, jointly.

The sizing or grading members B are readily lifted out of their working positions, being sustained in the latter disposition yieldingly by the springs 33; so that each sizing or grading member may be readily removed from working position, and may also be adjusted longitudinally of the table or support G.

The conveying means E is utilized for the purpose of conducting to one end of the mechanism or apparatus such imperfect fruit as may be withdrawn from the apparatus and thrown into the trough 42 and upon the moving belt 43 therein.

The apparatus or mechanism operates positively and rapidly and with great precision, the fruit supplied thereto being automatically selected as to size or grade number and segregated from the fruit stream within the bin with which the corresponding sizing or grading member B is associated, all without injury to the fruit.

I do not desire to be understood as limiting myself to the specific provision, construction, formation, association and relative arrangement of parts, members and features shown and described, but reserve the right to vary the same, in adapting the improvements to varying conditions of use, without departing from the spirit of the invention and the terms of the following claims.

Having thus described my invention, I claim and desire to secure by Letters Patent:—

1. In a fruit sizer or grader, a plurality of adjustable sizing or grading members, means for feeding fruit successively to the same, and co-acting guide-arms between and connected with the sizing or grading members.

2. In a fruit sizer or grader, a plurality of adjustable sizing or grading members, means for feeding fruit successively to the same, and overlapping guide-arms between and connected with the sizing or grading members.

3. In a fruit sizer or grader, means for feeding the fruit in a predetermined course of travel, a plurality of adjustable sizing or grading members arranged at one side of such course of travel, and guide-arms respectively connected with the sizing or grading members and extending between the same in overlapping relation.

4. In a fruit sizer or grader, means for feeding the fruit in a predetermined course of travel, a plurality of detachable adjustable sizing or grading members arranged at one side of such course of travel, and guide-arms respectively connected with the sizing or grading members and extending between the same in overlapping relation and substantially parallel with the course of travel of the fruit as moved by the feed means.

5. In a fruit sizer or grader, a table or support, means for feeding fruit along said table or support, a rail extending at one side of said table or support, a base plate detachably mounted upon said rail and upon said table or support beneath said feed means, means tensionally holding the base plate in position, and a sizing or grading member mounted upon said base plate.

6. In a fruit sizer or grader, a table or support, means for feeding fruit along said table or support, a rail extending at one side of said table or support, a base plate adjustably detachably mounted upon said rail and upon said table or support beneath said feed means, a sizing or grading member mounted upon said base plate, and tension means yieldingly holding said base plate in position of adjustment.

7. In a fruit sizer or grader, a plurality of relatively adjustable sizing or grading members, means for feeding fruit successively to the same, and a plurality of bins arranged to receive fruit in accordance with the relative adjustment of the sizing or grading members; said sizing or grading members being mounted for adjustment longitudinally of the fruit feeding means.

8. In a fruit sizer or grader, a plurality of sizing or grading members, means for feeding fruit successively to the same, and co-acting guide-arms between the sizing or grading members laterally of the fruit feeding means.

In testimony whereof, I have signed my name to this specification in the presence of two subscribing witnesses.

GEORGE D. PARKER.

Witnesses:
RAYMOND I. BLAKESLEE,
F. A. MANSFIELD.